(12) United States Patent
Chu et al.

(10) Patent No.: US 8,576,526 B2
(45) Date of Patent: Nov. 5, 2013

(54) REDUCED CURRENT LEAKAGE IN RC ESD CLAMPS

(75) Inventors: Albert M. Chu, Nashua, NH (US); Mujahid Muhammad, Essex Junction, VT (US); Daryl M. Seitzer, Essex Junction, VT (US); Rohit A. Shetty, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/398,038

(22) Filed: Feb. 16, 2012

(65) Prior Publication Data

US 2013/0215539 A1 Aug. 22, 2013

(51) Int. Cl.
H02H 9/00 (2006.01)
(52) U.S. Cl.
USPC .......................................................... 361/56
(58) Field of Classification Search
USPC .......................................................... 361/56
See application file for complete search history.

(56) References Cited

U.S. PATENT DOCUMENTS

| 5,510,947 | A | 4/1996 | Pellegrini et al. |
| 5,563,757 | A | 10/1996 | Corsi |
| 6,215,350 | B1 * | 4/2001 | Wyland .......................... 327/434 |
| 6,861,680 | B2 | 3/2005 | Ker et al. |
| 6,872,986 | B2 | 3/2005 | Fukuda et al. |
| 6,885,529 | B2 | 4/2005 | Ker et al. |
| 7,098,513 | B2 | 8/2006 | Chatty et al. |
| 7,203,045 | B2 | 4/2007 | Chatty et al. |
| 7,274,546 | B2 | 9/2007 | Gauthier, Jr. et al. |
| 7,359,170 | B2 * | 4/2008 | Behzad et al. ................. 361/56 |
| 7,483,247 | B2 | 1/2009 | Poon et al. |
| 7,639,463 | B2 | 12/2009 | Steinhoff et al. |
| 7,838,924 | B2 | 11/2010 | Boselli et al. |
| 8,315,025 | B2 * | 11/2012 | Hartberger ..................... 361/56 |
| 2004/0190209 | A1 | 9/2004 | Jozwiak et al. |
| 2004/0224452 | A1 | 11/2004 | Li et al. |
| 2006/0050451 | A1 * | 3/2006 | Jen-Chou ........................ 361/56 |
| 2006/0198069 | A1 | 9/2006 | Chuan et al. |
| 2007/0053120 | A1 | 3/2007 | Gauthier, Jr. et al. |
| 2009/0135533 | A1 * | 5/2009 | Ker et al. ........................ 361/56 |
| 2009/0268359 | A1 | 10/2009 | Chatty et al. |
| 2010/0328826 | A1 | 12/2010 | Salman et al. |
| 2011/0063765 | A1 | 3/2011 | Boselli et al. |
| 2012/0236444 | A1 * | 9/2012 | Srivastava et al. ............. 361/56 |

OTHER PUBLICATIONS

Ker et al, ESD-Protection Design with Extra Low-Leakage-Current Diode String for RF Circuits in SiGe BiCMOS Process, IEEE Transactions on Device and Materials Reliability, vol. 6, No. 4, Dec. 2006, pp. 517-527.

(Continued)

*Primary Examiner* — Rexford N Barnie
*Assistant Examiner* — Ann Hoang
(74) *Attorney, Agent, or Firm* — David A. Cain; Hoffman Warnick LLC

(57) ABSTRACT

Aspects of the invention provide an electrostatic discharge (ESD) protection device with reduced current leakage, and a related method. In one embodiment, an ESD protection device for an integrated circuit (IC) is provided. The ESD protection device includes: a resistor-capacitor (RC) timing circuit for selectively turning on the ESD protection device during an ESD event; a trigger circuit for receiving an output of the RC timing circuit and generating a trigger pulse for driving at least one of: a first ESD clamp and a second ESD clamp; and a selection circuit for selecting one of: the trigger circuit or a charge pump for controlling the second ESD clamp.

18 Claims, 3 Drawing Sheets

(56) References Cited

OTHER PUBLICATIONS

Cao et al., "ESD Design Challenges and Strategies in Deeply-scaled Integrated Circuits", IEEE 2009 Custom Intergrated Circuits Conference (CICC), 2009, pp. 681-688.

Tong et al., "A Novel Substrate-Triggered ESD Protection Structure for a Bus Switch IC with On-Chip Substrate- Pump", IEEE International Symposium on Circuits and Systems (ISCAS), 2005, pp. 1190-1193.

* cited by examiner

REDUCED CURRENT LEAKAGE IN RC ESD CLAMPS

FIELD OF THE INVENTION

The disclosure relates generally to integrated circuit (IC) devices, and more particularly, to an electrostatic discharge protection device with reduced current leakage, and a related method.

BACKGROUND

Electrostatic discharge (ESD) is the transfer of electrostatic charge between bodies at different electrostatic potentials (voltages), and can destroy and seriously impair IC devices. ESD protection devices are often built into IC devices, in order to protect the various electronic components with the IC device.

Standards for ESD protection devices are created by a standardization organization, such as the Joint Electron Devices Engineering Council (JEDEC). Some of these standards include the human-body model (HBM), the machine model (MM), and the charge-device model (CDM). Each model characterizes the susceptibility of an electronic device (e.g., an IC) to damage from ESD.

The HBM simulates the ESD which may occur from the charge that accumulates in a human body discharging through the electronic device. The MM simulates the ESD which may occur from the charge that accumulates in a manufacturing machine (for packaging and probing) discharging through the electronic device. The goal of the CDM is to simulate the discharge from the device through mechanical means which contact is made to a low impedance ground or a charge sink. For example, this may occur when the electronic device slides down a feeder tube during board assembly.

BRIEF SUMMARY

Aspects of the invention provide an ESD protection device with for reduced current leakage, and a related method. In one embodiment, an ESD protection device for an IC is provided. The ESD protection device includes: a resistor-capacitor (RC) timing circuit for selectively turning on the ESD protection device during an ESD event; a trigger circuit for receiving an output of the RC timing circuit and generating a trigger pulse for driving at least one of: a first ESD clamp and a second ESD clamp; and a selection circuit for selecting one of: the trigger circuit or a charge pump for controlling the second ESD clamp.

A first aspect of the disclosure provides an electrostatic discharge (ESD) protection device for an integrated circuit (IC), comprising: a resistor-capacitor (RC) timing circuit for selectively turning on the ESD protection device during an ESD event; a trigger circuit for receiving an output of the RC timing circuit and generating a trigger pulse for driving at least one of: a first ESD clamp and a second ESD clamp; and a selection circuit for selecting one of: the trigger circuit or a charge pump for controlling the second ESD clamp.

A second aspect of the disclosure provides an integrated circuit (IC), comprising: a charge pump for supplying a negative bias voltage; and a plurality of electrostatic discharge (ESD) protection devices for the IC, each ESD protection device comprising: a resistor-capacitor (RC) timing circuit for selectively turning on the ESD protection device during an ESD event; a trigger circuit for receiving an output of the RC timing circuit and generating a trigger pulse for driving at least one of: a first ESD clamp and a second ESD clamp; and a selection circuit for selecting one of: the trigger circuit or the charge pump for controlling the second ESD clamp.

A third aspect of the disclosure provides a method of reducing current leakage in an electrostatic discharge (ESD) protection device for an integrated circuit (IC), the method comprising: providing a first ESD clamp directly connected to an RC timing circuit and a trigger circuit of the ESD protection device; providing a selection circuit that connects the trigger circuit to a second ESD clamp; turning off the second ESD clamp, in response to the selection circuit selecting a charge pump to control the second ESD clamp; and in response to an ESD event, selecting, using the selection circuit, the trigger circuit to control the second ESD clamp.

BRIEF DESCRIPTION OF THE DRAWINGS

The above and other aspects, features and advantages of the disclosure will be better understood by reading the following more particular description of the disclosure in conjunction with the accompanying drawings.

Figure 1:
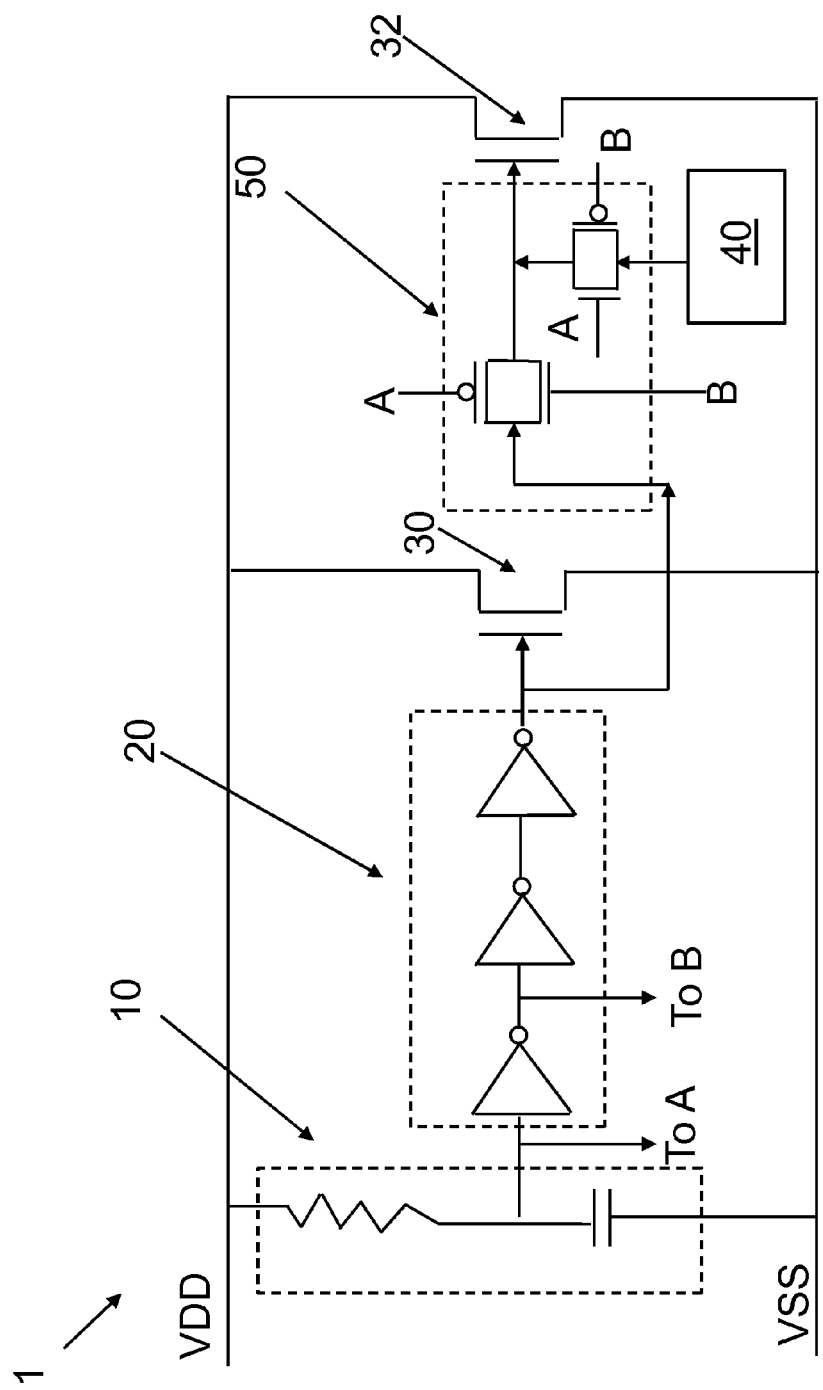
FIG. 1 shows a schematic diagram of an electrostatic discharge protection device according to embodiments of the invention.

The drawings are not necessarily to scale. The drawings are merely schematic representations, not intended to portray specific parameters of the disclosure. The drawings are intended to depict only typical embodiments of the disclosure, and therefore should not be considered as limiting the scope of the disclosure. In the drawings, like numbering represents like elements.

DETAILED DESCRIPTION

The disclosure relates generally to integrated circuit (IC) devices, and more particularly, to an electrostatic discharge protection device for reducing current leakage, and a related method.

BACKGROUND

Electrostatic discharge (ESD) is the transfer of electrostatic charge between bodies at different electrostatic potentials (voltages), and can destroy and seriously impair IC devices. ESD protection devices are often built into IC devices, in order to protect the various electronic components with the IC device.

Standards for ESD protection devices are created by a standardization organization, such as the Joint Electron Devices Engineering Council (JEDEC). Some of these standards include the human-body model (HBM), the machine model (MM), and the charge-device model (CDM). Each model characterizes the susceptibility of an electronic device (e.g., an IC) to damage from ESD. The electronic device must be designed to comply with each of these standards.

The HBM simulates the ESD which may occur from the charge that accumulates in a human body discharging through the electronic device. The MM simulates the ESD which may occur from the charge that accumulates in a manufacturing machine (for packaging and probing) discharging through the electronic device. The goal of the CDM is to simulate the discharge from the device through mechanical means which contact is made to a low impedance ground or a charge sink. For example, this may occur when the electronic device slides down a feeder tube during board assembly.

With the decrease in channel lengths in the latest technologies (for example, the 32 nm silicon-on-insulator (SOI) technology or the 28 nm CMOS technology), high current leakage in the current ESD protection devices has been difficult to avoid. In particular, the CDM standard is harder to meet compared to the MM standard or the HBM standard due to the higher current limits. To handle the higher current limits, and comply with the CDM standard, additional clamps are required for the ESD protection device. However, the additional clamps increase the size of the overall ESD protection device. Additionally, each clamp naturally exhibits a current leakage, so the addition of numerous clamps increases the overall current leakage of the ESD protection device.

Aspects of the invention provide an ESD protection device for reducing current leakage, and a related method. In one embodiment, an ESD protection device for an IC is provided. The ESD protection device includes: a resistor-capacitor (RC) timing circuit for selectively turning on the ESD protection device during an ESD event; a trigger circuit for receiving an output of the RC timing circuit and generating a trigger pulse for driving at least one of: a first ESD clamp and a second ESD clamp; and a selection circuit for selecting one of: the trigger circuit or a charge pump for controlling the second ESD clamp. It is only under the condition of an ESD event that the second ESD clamp is turned on. Therefore, the transistors within the second ESD clamp will not exhibit any current leakage, and the overall leakage of the ESD protection device decreases.

Turning to FIG. 1, a schematic diagram of an electrostatic discharge (ESD) protection device 1 according to embodiments of the invention is shown. ESD protection device 1 includes a resistor-capacitor (RC) timing circuit 10 for selectively turning on the ESD protection device 1 during an ESD event. Although FIG. 1 shows a resistor at the top of the RC timing circuit 10 and a capacitor at the bottom of the RC timing circuit 10, it is understood that this is for exemplary purposes only, and that the capacitor may be at the top of the RC timing circuit 10, and the resistor may be at the bottom of the RC timing circuit 10.

An output "A" of the RC timing circuit 10 is sent to a trigger circuit 20. As shown in FIG. 1, the trigger circuit 20 includes a plurality of inverters. Although FIG. 1 only shows 3 inverters, it is understood that the trigger circuit 20 may include any number of inverters, such that the output of the trigger circuit 20 is the opposite of the output of the RC timing circuit 10.

The trigger circuit 20 generates a trigger pulse (not shown) for driving an ESD clamp. As shown in FIG. 1, the output of the trigger circuit 20 is directly connected to a first ESD clamp 30. Although FIG. 1 shows the first ESD clamp 30 as a single n-type field-effect transistor (FET), it is understood that this is for clarity and exemplary purposes only, and that the first ESD clamp 30 may include any number of n-type FETs.

A second ESD clamp 32 is also shown in FIG. 1. Between the first ESD clamp 30 and the second ESD clamp 32 is a selection circuit 50. The selection circuit 50 is configured to select one of: the trigger circuit 20 or a charge pump 40 for controlling the second ESD clamp 32.

The selection circuit 50 includes a pair of transmission gates (not numbered). A first transmission gate of the selection circuit 50 is directly connected to the output of the trigger circuit 20, while the second transmission gate of the selection circuit 50 is directly connected to the charge pump 50. The charge pump 50, as known in the art, generates a negative voltage bias for driving the second transmission gate of the selection circuit 50. Both the first transmission gate and the second transmission gate of the selection circuit 50 are connected to the second ESD clamp 32.

Each transmission gate includes a p-type FET and a n-type FET connected together. As seen in FIG. 1, the p-type FET of the first transmission gate (directly connected to the trigger circuit 20) of the selection circuit 50 receives the "A" output of the RC timing circuit 10, while the n-type FET of the first transmission gate of the selection circuit 50 receives the "B" output of the first inverter of the trigger circuit 20. The p-type FET of the second transmission gate (directly connected to the charge pump 40) of the selection circuit 50 receives the "B" output of the first inverter of the trigger circuit 20, while the n-type FET of the second transmission gate of the selection circuit 50 receives the "A" output of the RC timing circuit 10. That is, the first transmission gate receives the opposite inputs as the second transmission gate, of the selection circuit 50. Therefore, the first transmission gate and the second transmission gate are turned "on" as opposite moments.

Under normal conditions, if the output of the RC timing circuit 10 is a "1", a "1' is provided to the p-type FET of the first transmission gate (directly connected to the trigger circuit 20, while a "0" is provided to the n-type FET of the first transmission gate. In other words, the first transmission gate of the selection circuit 50 is turned "off" during normal conditions.

Once an ESD event occurs, a "0" is received from the RC timing circuit 10, which turns on the first transmission gate (directly connected to the trigger circuit 20), while the second transmission gate of the selection circuit 50 (directly connected of the second ESD clamp 32) turns off. Therefore, the charge pump 40 no longer controls the second ESD clamp 32. The output of the trigger circuit 20 is sent to both the first ESD clamp 30 and the second ESD clamp 32. As such, since an ESD event occurred, any additional electrostatic properties are clamped by the first ESD clamp 30 and the second ESD clamp 32. However, since the second ESD clamp 32 is not turned on until the ESD event occurs, the current leakage from the second ESD clamp 32 does not significantly affect the overall current leakage of the ESD protection device 1.

Figure 2:
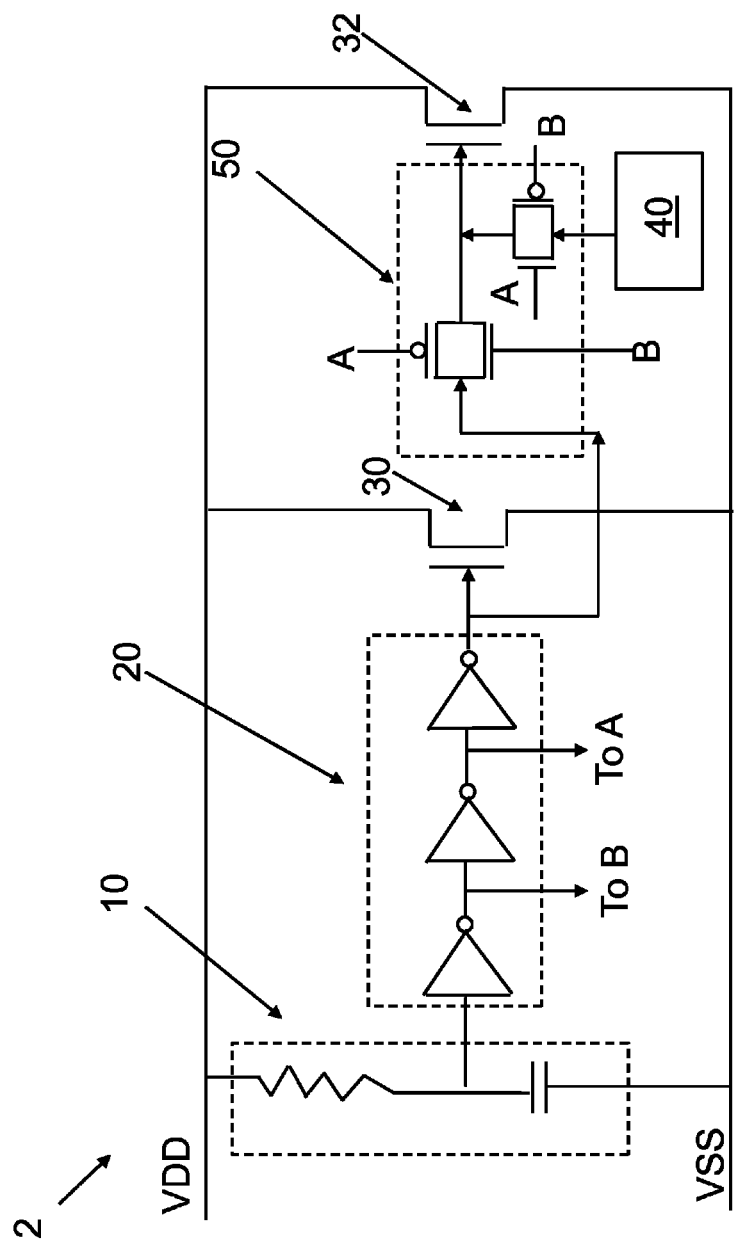
FIG. 2 shows a schematic diagram of an electrostatic discharge protection device according to embodiments of the invention.

Turning now to FIG. 2, a schematic diagram of an electrostatic discharge protection device 2 according to embodiments of the invention is shown. It is understood that the ESD protection device 2 shown in FIG. 2 is substantially identical to the ESD protection device 1 shown in FIG. 2. However, the "A" input to the transmission gates of the selection circuit 50 is no longer from the output of the RC timing circuit 10. Rather, the "A" input to the transmission gates of the selection circuit 50 is connected to the output of the second inverter in the trigger circuit 20.

Figure 3:
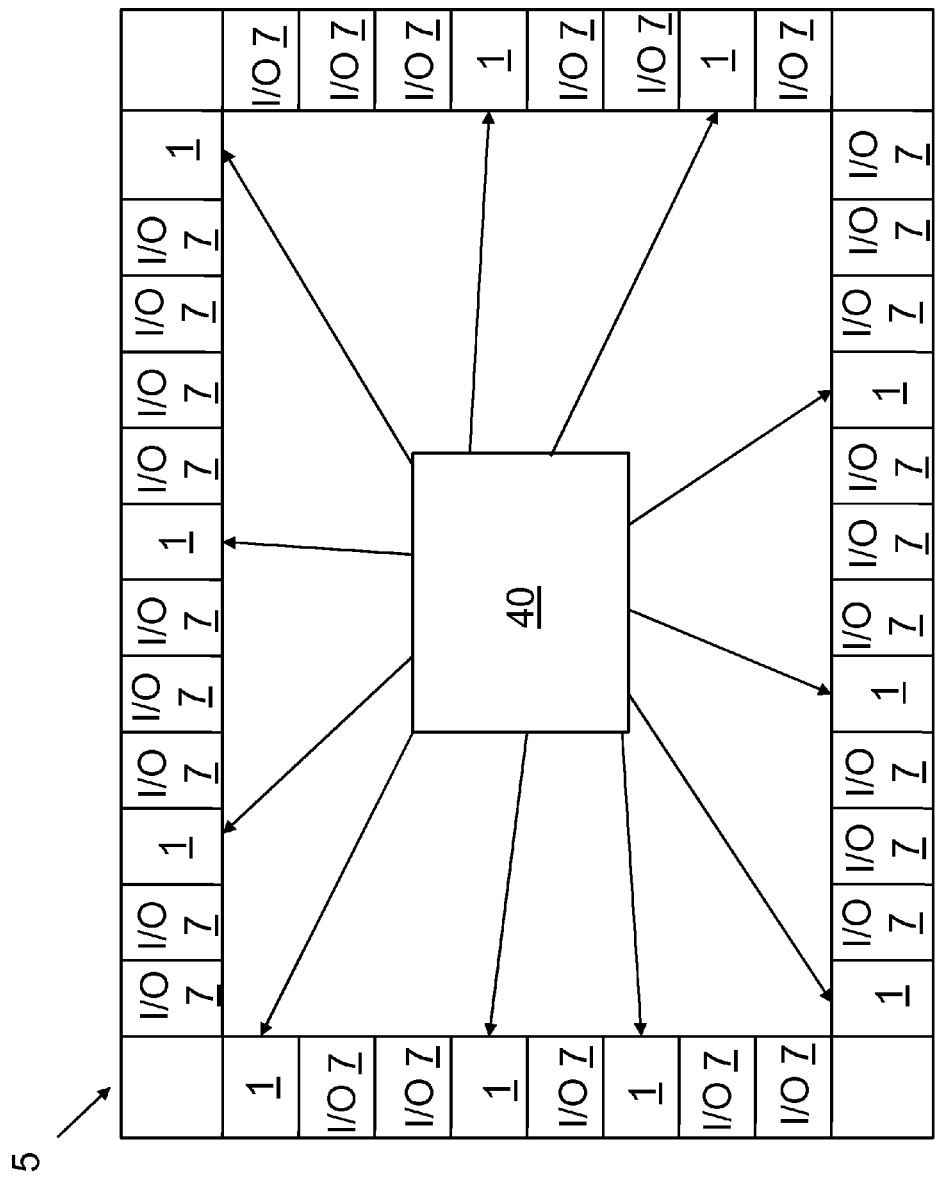
FIG. 3 shows a schematic diagram of an integrated circuit including an electrostatic discharge protection device according to embodiments of the invention.

Turning now to FIG. 3, a schematic diagram of an integrated circuit (IC) 5 including an electrostatic discharge protection device according to embodiments of the invention is shown. The IC 5 shown in FIG. 3 includes a plurality of I/O devices 7. In between several of these I/O devices 7 may include an ESD protection device 1, as shown in FIGS. 1-2. However, each ESD protection device 1 does not require a separate charge pump 40. Rather, a single charge pump 40 may be provided to each ESD protection device 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrostatic discharge (ESD) protection device for an integrated circuit (IC), comprising:
   a resistor-capacitor (RC) timing circuit for selectively turning on the ESD protection device during an ESD event;
   a trigger circuit for receiving an output of the RC timing circuit and generating a trigger pulse for driving at least one of: a first ESD clamp and a second ESD clamp; and
   a selection circuit for selecting one of: the trigger circuit or a charge pump for controlling the second ESD clamp, wherein the charge pump controls the second ESD clamp in an absence of the ESD event, and wherein the trigger circuit controls the second ESD clamp in response to the ESD event;
   the selection circuit including:
      a first transmission gate for connecting the trigger circuit to the second ESD clamp in response to the ESD event; and
      a second transmission gate for disconnecting the charge pump from the second ESD clamp in response to the ESD event.

2. The ESD protection device of claim 1, wherein the trigger circuit includes a plurality of inverters.

3. The ESD protection device of claim 1, wherein the first ESD clamp includes a plurality of n-type field-effect transistors.

4. The ESD protection device of claim 1, wherein the second ESD clamp includes a plurality of n-type field-effect transistors.

5. The ESD protection device of claim 1, wherein the first transmission gate is connected to the output of the trigger circuit and the second ESD clamp.

6. The ESD protection device of claim 5, wherein the second transmission gate is connected to the charge pump and the second ESD clamp.

7. An integrated circuit (IC), comprising:
   a charge pump for supplying a negative bias voltage; and
   a plurality of electrostatic discharge (ESD) protection devices for the IC, each ESD protection device comprising:
      a resistor-capacitor (RC) timing circuit for selectively turning on the ESD protection device during an ESD event;
      a trigger circuit for receiving an output of the RC timing circuit and generating a trigger pulse for driving at least one of: a first ESD clamp and a second ESD clamp; and
      a selection circuit for selecting one of: the trigger circuit or the charge pump for controlling the second ESD clamp, wherein the charge pump controls the second ESD clamp in an absence of the ESD event, and wherein the trigger circuit controls the second ESD clamp in response to the ESD event;
      the selection circuit including:
         a first transmission gate for connecting the trigger circuit to the second ESD clamp in response to the ESD event; and
         a second transmission gate for disconnecting the charge pump from the second ESD clamp in response to the ESD event.

8. The IC of claim 7, wherein each trigger circuit includes a plurality of inverters.

9. The IC of claim 7, wherein the first ESD clamp of each ESD protection device includes a plurality of n-type field-effect transistors.

10. The IC of claim 7, wherein the second ESD clamp of each ESD protection device includes a plurality of n-type field-effect transistors.

11. The IC of claim 7, wherein the first transmission gate of each ESD protection device is connected to the output of the trigger circuit and the second ESD clamp of the respective ESD protection device.

12. The IC of claim 11, wherein the second transmission gate of each ESD protection device is connected to the second ESD clamp of the respective ESD protection device and the charge pump of the IC.

13. A method of reducing current leakage in an electrostatic discharge (ESD) protection device for an integrated circuit (IC), the ESD protection device including a first ESD clamp connected to an RC timing circuit and a trigger circuit, a selection circuit for selectively connecting the trigger circuit to a second ESD clamp, and a charge pump, the method comprising:
   turning off the second ESD clamp in an absence of an ESD event by connecting, by the selection circuit, the charge pump to the second ESD clamp; and
   turning on the second ESD clamp in response to the ESD event by disconnecting the charge pump from the second ESD clamp using the selection circuit and connecting the trigger circuit to the second ESD clamp using the selection circuit.

14. The method of claim 13, wherein the selection circuit includes two transmission gates.

15. The method of claim 14, further comprising, in response to the absence of the ESD event and the selection circuit connecting the charge pump to the second ESD clamp, turning off a first transmission gate and turning on a second transmission gate connected to the charge pump.

16. The method of claim 15, further comprising, in response to the ESD event, turning on the first transmission gate and turning off the second transmission gate.

17. The method of claim 16, further comprising, in response to turning on the first transmission gate, turning on the second ESD clamp.

18. The method of claim 17, further comprising dissipating a charge of the ESD event through the first ESD clamp and the second ESD clamp.

* * * * *